United States Patent [19]

Del Rosso

[11] Patent Number: 4,564,077
[45] Date of Patent: Jan. 14, 1986

[54] POWERED CONVEYING AND WEIGHING MACHINE

[75] Inventor: Victor Del Rosso, Ithaca, N.Y.

[73] Assignee: Hi-Speed Checkweigher Co., Inc., Ithaca, N.Y.

[21] Appl. No.: 613,438

[22] Filed: May 24, 1984

[51] Int. Cl.[4] .................... G01G 19/00; G01G 21/00; G01G 23/00
[52] U.S. Cl. .................... 177/145; 177/128; 177/161; 177/50; 198/504
[58] Field of Search .................. 177/50, 128, 145, 161, 177/163, 211; 198/502, 504

[56] References Cited

U.S. PATENT DOCUMENTS

| | | | |
|---|---|---|---|
| 3,180,475 | 4/1965 | Del Rosso | 177/161 X |
| 3,870,140 | 3/1975 | Wieser | 198/817 |
| 3,942,624 | 3/1976 | Kupcikevicius | 198/817 X |
| 4,023,668 | 5/1977 | De Santo | 177/145 X |
| 4,049,068 | 9/1977 | Kavanaugh et al. | 177/145 X |
| 4,114,707 | 9/1978 | Del Rosso | 177/145 |

Primary Examiner—E. A. Goldberg
Assistant Examiner—Patrick W. Foster
Attorney, Agent, or Firm—Bean, Kauffman & Bean

[57] ABSTRACT

An improved motorized conveying and weighing or checkweighing machine is disclosed for use such as in between article feeding and take-away conveyors. The machine comprises essentially a machine support member; a compression type strain gage transducer mounted upon said support member; an angularly configured structure including a vertically standing side wall portion and a bottom sidewise extending bracket portion which is so fixed upon the top portion of said transducer as to dispose said side wall portion to extend in parallel offset relation to the plan view longitudinal profile of said transducer. Conveyor belt driving rollers are rotatably mounted upon and extend in cantilever relation away from said side wall portion and an endless conveyor belt trains about said rollers. A power supply unit is suspended from said side wall portion in longitudinally offset relation with said transducer and in plan view congruency alignment with said belt means whereby the transducer and power supply and conveyor means are substantially congruent within a common plan view profile which is of minimal width.

9 Claims, 6 Drawing Figures

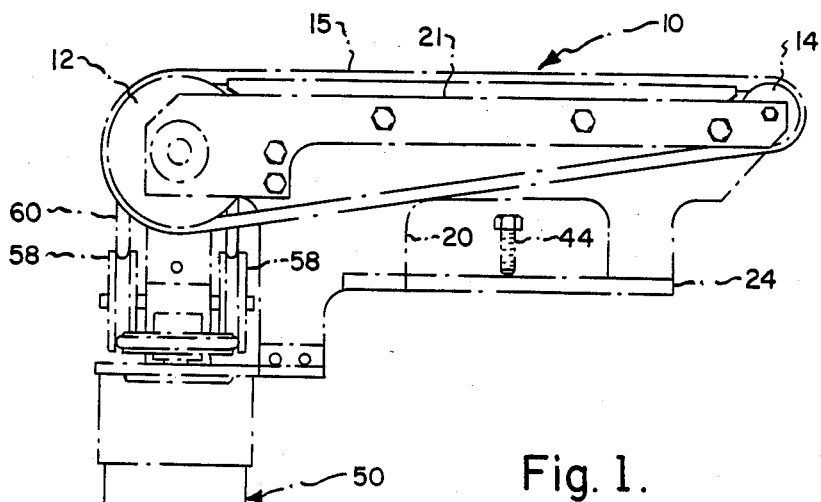
Fig. 1.
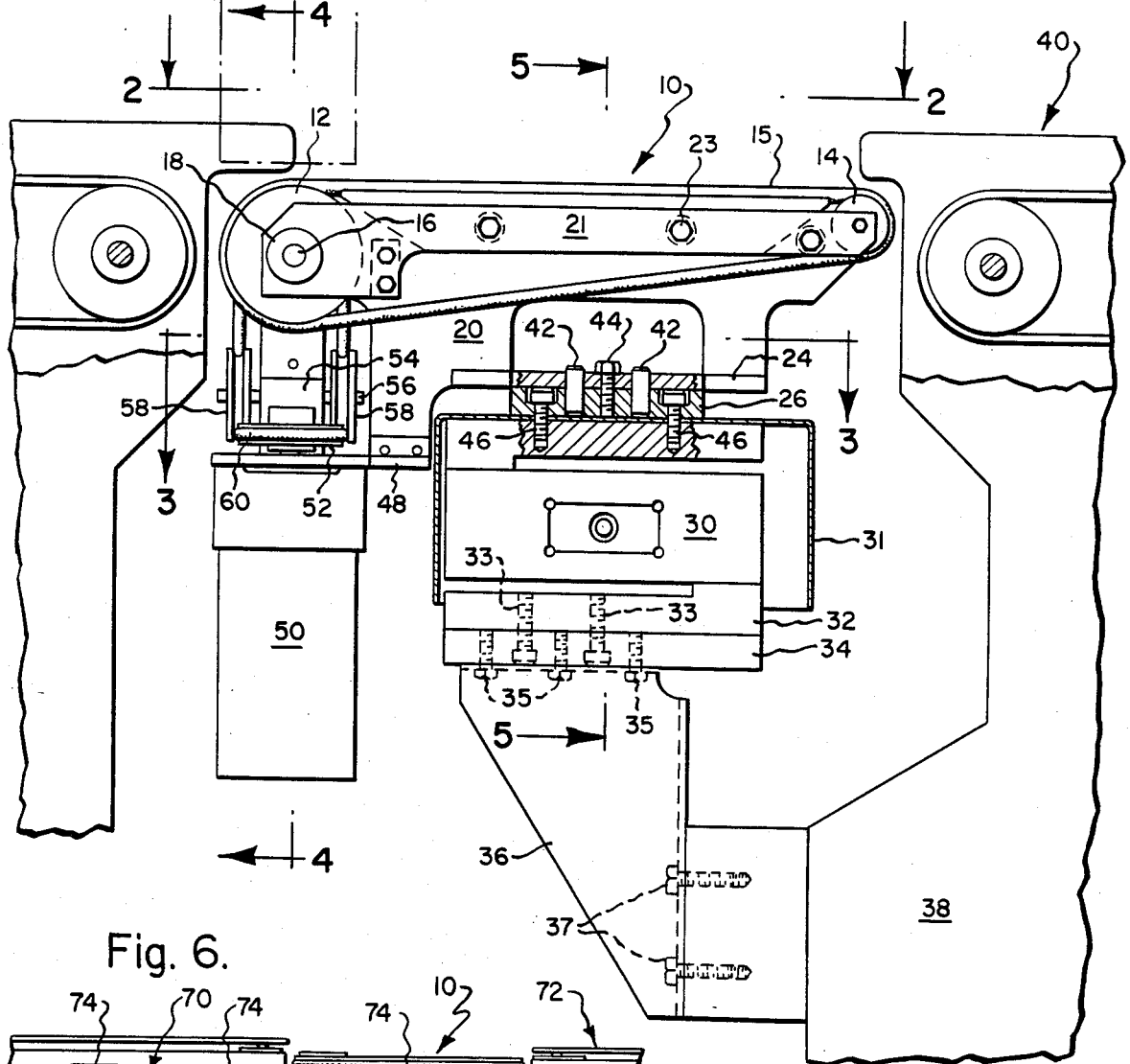
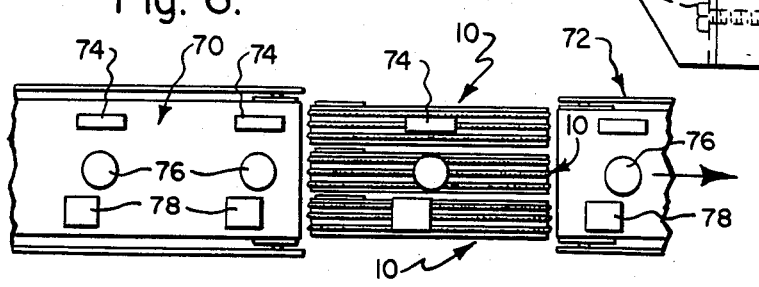
Fig. 6.

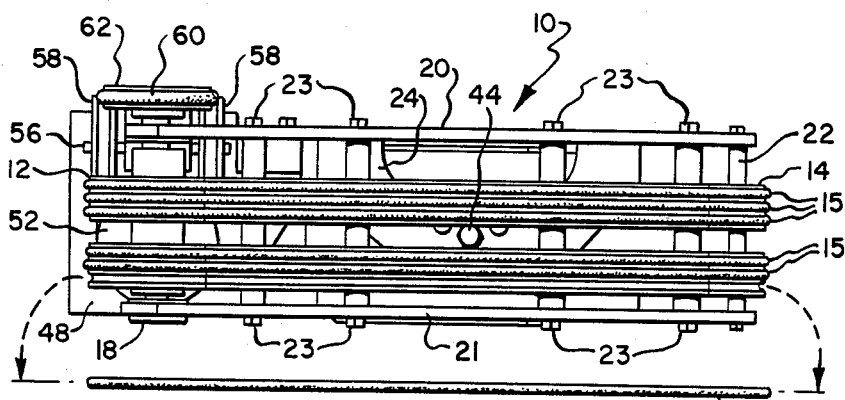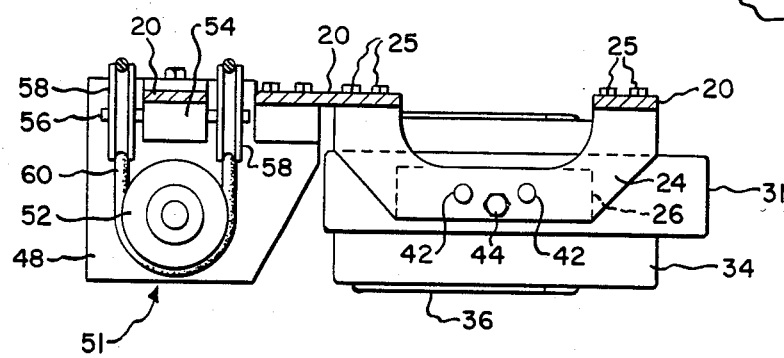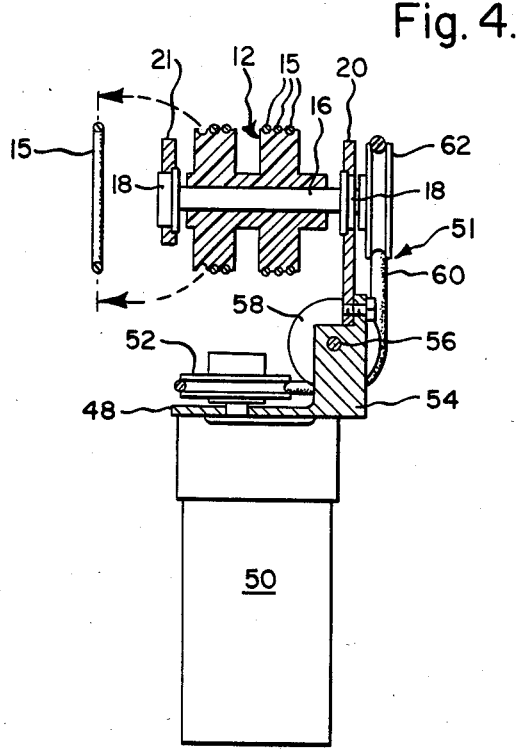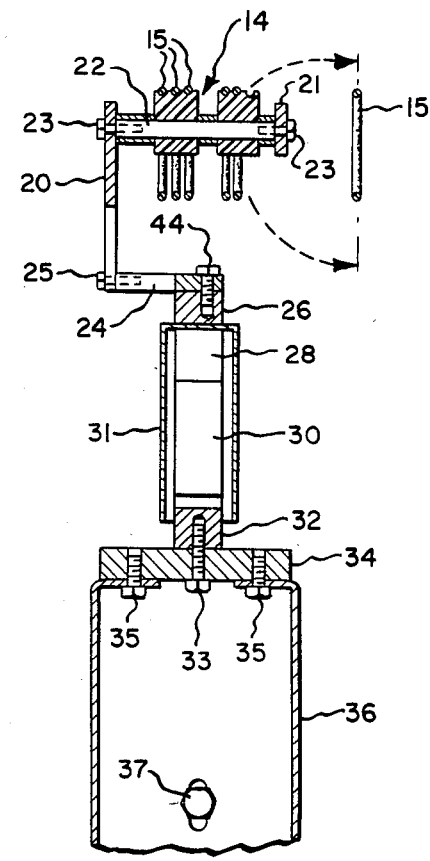

POWERED CONVEYING AND WEIGHING MACHINE

BACKGROUND AND OBJECTS OF THE INVENTION

This invention relates to industries which employ motorized, high speed transporting (and incidental thereto) the weighing or checkweighing of production line products; the weights of which are to be reported/registered/price-calculated/printed-out, or otherwise visually displayed. By way of example, U.S. Pat. Nos. 3,070,214; 3,180,475; 4,114,707 and 4,415,048 relate to machines currently employed in such industries.

More particularly, the invention relates to the use of so-called powered platform scales for weighing discrete articles being conveyed in succession at high speeds over a weighing device; the product weights of which in typical cases are to be visually displayed and also graphically recorded. In such machines, the weight detecting/reporting components thereof are subjected to error inductive dynamics such as are not encountered "stationary" platform type weighing machines.

The present invention provides several improvement features vis-a-vis the prior art; and fulfills the need for a compact, small-sized machine which is more operationally versatile and useful in a production line weigh-out assembly as aforesaid when confronted by a variety of short order/long order and/or otherwise transitory production line set-up and/or system readjustment problems. Also, the machine of the invention is readily accessible to inspection and/or disassembly for such as clean-out/sanitizing and/or servicing purposes.

The objects of the invention are accomplished by providing multiples of thinly profiled (in plan view) weighing conveyor machines, which by virtue of unique "offset" relative arrangements of essential operative and structural components thereof are more adaptable to efficiently meet the aforesaid system readjustment problems.

BRIEF SUMMARY OF THE INVENTION

In a preferred form of the invention, the base portion of the machine includes a strain gage load cell transducer of the type for example shown in U.S. Pat. Nos. 4,143,727 and 4,146,100, which feature strain gage elements protected from torque bending moments. The conveyor per se is of the multiple parallel, endless elastic O-ring type; the rings of which run in grooved pulleys carried by shafts which are cantilever-supported by a side wall member extending upwardly from a base plate which is detachably mounted on the top beam of the transducer. The side wall plate also carries a combination motor/gear and drive pulley unit depending therefrom; and an endless O-ring type belt operationally interconnects the drive pulley and a driven pulley which is keyed to the conveyor drive shaft.

The machine of the invention features a unique "offset" structural relationship arrangement of the essential operational components thereof, whereby the machine is of a uniquely narrow plan view profile, enabling multiples thereof to be more efficiently employed in side-by-side relation to provide for improved versatilities in meeting variously encountered system adjustment problems.

BRIEF DESCRIPTION OF THE DRAWINGS

The preferred form of the invention is illustrated herewith by means of drawings wherein:

FIG. 1 is a side elevational view of the machine which is shown in operative combination with fragmentally illustrated typical articles-to-be-weighed delivering and takeoff conveyors. FIG. 1 also illustrates by means of broken lines how the machine may be disassembled for inspection/clean-out/servicing purposes;

FIG. 2 is a top plan view of the machine taken as along line 2—2 of FIG. 1;

FIG. 3 is a fragmentary sectional/plan view of a portion of the machine taken as along line 3—3 thereof;

FIGS. 4 and 5 are sectional views taken as along lines 4—4 and 5—5 thereof, respectively; and FIG. 6 is a schematic plan view illustrating how multiples of machines of the invention may be effectively employed in cooperation with single product delivery and discharge conveyors when servicing a multiple product line weighing/checkweighing system.

DETAILED DESCRIPTION

As illustrated herewith, the product conveyor component of the machine is illustrated generally by the numeral 10 and by way of example may comprise a multiply-grooved drive pulley 12 and a multiply-grooved idler pulley 14 about which train endless elastic O-rings 15. However, it is to be understood that a single elastic endless flat belt device or the like may alternately be employed. The drive pulley 12 of this example is keyed to a shaft 16 which is rotationally and cantilever supported by means of a bearing 18 which is carried by a side wall plate 20. The idler pulley 14 rotates on a stub shaft 22 which also extends in cantilever supported relation from the side wall plate 20. A tie plate 21 is similarly mounted on the extended ends of the shafts 16,22, and is further integrated with the side wall plate 20 by means of cross bars 23 to provide a rigid framework carrying the conveyor assembly. The side wall plate 20 extends in sidewise offset relation and vertically from a bracket 24, being fastened thereto by screws 25. The bracket 24 rests upon a block 26 which in turn rests upon the top beam 28 of a compression strain gage type transducer which is designated generally at 30. The bottom beam element 32 of the transducer in turn rests upon and is fastened by screws 33 to a base support 34.

The base support 34 may of course be carried upon any suitable floor support device so that the machines are readily and independently movable into operative positions between product delivery and discharge conveyor lines and in accordance with any desired combinations therewith, such as is illustrated by FIG. 6. However, if preferred, for more permanent installations, the plate 34 may be provided for example by supporting it upon and fastening it such as by screws 35 to a bracket 36 which is detachably mountable as shown at 37 to the base platform structure 38 of a product delivery conveyor such as is designated generally at 40. Thus, it is to be importantly understood that the machine of the invention may be supported upon any suitable means so that the machine is readily shiftable from place to place for operation in conjunction with such as product delivery/discharge machines. A cover for the transducer unit is preferably provided as shown at 31.

As best shown at FIG. 1, the conveyor bracket plate as shown at 24 is preferably multiply apertured to accommodate a pair of locating pins 42,42 which upstand from the block 26; and a machine screw 44 is provided to extend through the plate 24 into threading engagement with the block 26. The block 26 in turn is fastened such as by machine screws 46,46 to the top beam 28 of the transducer. Thus, it will be apparent that upon removal of the screw 44, the conveyor unit may be lifted away from the transducer unit as shown by broken lines at FIG. 1 for servicing or the like. Also, the O-ring conveyor strand(s) 15 may thus be pulled away sidewise from their pulleys such as for replacement purposes or the like as shown at FIGS. 2, 4 and 5, by simply stretching and slipping them over the plate 21.

The side wall portion 20 of this form of the machine carries at its lower edge a horizontally extending bracket plate 48 from which hangs the drive motor/gear unit which is designated generally at 50. The conveyor power transmission means is designated generally by numeral 51, and includes a drive shaft and pulley unit 52 which extends from the top of the motor/gear unit. The bracket plate 48 includes an upstanding abutment portion 54 which journals in this example by means of an axle 56, a pair of pulleys 58,58 about which trains an endless drive belt 60. The belt 60 encircles the motor drive pulley 52, then trains upwardly around the pulleys 58,58 and thence upwardly around the conveyor drive pulley 62 which is keyed to the conveyor shaft 16. However, it is to be understood that any other suitable power transmission arrangement may be employed to operatively interconnect the power unit output device and the conveyor drive roller. It is to be noted however, that whereas the machine illustrated at FIGS. 2, 4 and 5 employs a product conveying system comprising dual spaced-apart tracked rollers 12 at opposite ends of the conveyor system, any other type belt or O-ring carrying roller devices may be employed.

A particular feature of the machine is that by virtue of the structural relationships of the essential components thereof, the transducer 30 and the conveyor drive mechanisms (in tandem relation therewith) all reside in uniquely slim plan view congruence and substantially within the profile of the conveyor component per se. Therefore, any number of such devices are readily installed in multiple parallel arrangements for closely spaced multiple product delivery, or shiftable about for interdiction between product line delivery and taking away conveyor systems for use in accommodating from time to time required changes in the overall product lines weighing or check-weighing facility.

FIG. 6 illustrates by way of example employment of three separate and individually driven weighing conveyors 10 of the invention which are arranged in side-by-side relation for weighing or checkweigh-service between single delivery and takeoff conveyors 70,72 three separate lines of products designated 74,76,78, respectively. It is of course understood that the belt or O-ring carrying rollers thereof may be of any track roll form and/or grooved to accommodate in each case any number of belts or O-rings in lieu of the three O-ring arrangement shown at FIG. 6.

Thus, it will be apparent that because of the unique structural relationships of the conveyor and the motor drive unit vis-a-vis the transducer component of the machine, the machine is of a narrow plan view profile, and otherwise of an improved space-saving configuration. This adapts it to be readily shifted about wherever needed in a production line; and/or to be employed with similar companion machines in side-by-side relation to provide facilities quickly responsive to requirements for rearrangements in parallel product conveying weighing/checkweighing production lines or the like.

What is claimed is:

1. A high speed operating motorized conveying and weighing or checkweighing machine for transporting and weighing articles in succession for use such as in between rapid article feeding and take-away conveyors and in conjunction with interim weight measuring and readings transmitting analog converting and print-out, visual display price-labeling of item price-calculated devices or the like; said machine comprising;

(a) a machine support member (34);
    (b) compression type strain gage transducer means (30) having a plan view longitudinally extended configuration mounted upon said support member (34);
    (c) an angularly configured structure including a bottom horizontal bracket portion (24) fixed upon a top portion of said transducer means (30) and a side wall portion (20) vertically upstanding from one edge of said bracket portion (24) and extending in parallel offset relation to the plan view longitudinal profile of said transducer means (30), said side wall portion (20) having one end thereof longitudinally offset relative to said transducer means (30);
    (d) conveyor means (10) cantilever supported by said side wall portion (20) to extend in an overlying relation with the longitudinal profile of said transducer means (30), said conveyor means (10) including a conveyor belt driving roller (12) keyed to axle means (16) which is rotatably mounted upon and extends in cantilever relation laterally away from said one end of said side wall portion (20), a conveyor belt idler roller (14) rotatably carried by axle means (22) which is mounted upon and extends in cantilever relation horizontally away from an opposite end of said side wall portion (20) and endless conveyor belt means (15) training about said drive and idler rollers;
    (e) a power supply unit (50) cantilever supported by said one end of said side wall portion (20) to underlie said conveyor means in longitudinally offset relation with said transducer means (30); and
    (f) power transmission means (51) operatively interconnecting said power supply unit (50) and said conveyor drive roller (12), characterized in that said transducer means and said power supply unit and said power transmission means and said conveyor means are substantially congruent within a common plan-view profile which is of minimal width.

2. A machine as set forth in claim 1 wherein said axle means (16) extends through said side wall member, and externally thereof carries means (62) for operative interconnection with said power transmission means (51).

3. A machine as set forth in claim 1 wherein said side wall base portion is detachably mounted on said transducer, and is readily removable therefrom.

4. A machine as set forth in claim 1 wherein said conveyor belt means comprises a plurality of elastic O-rings.

5. A machine as set forth in claim 4 wherein said driving roller and said idling roller are grooved in mutual longitudinal alignments to accommodate therein said plurality of O-rings.

6. A machine as set forth in claim 1 wherein said power supply unit comprises integrally housed motor and speed reduction means.

7. A machine as set forth in claim 6 wherein said power transmission means comprises one or more resilient O-rings.

8. A machine as set forth in claim 1, wherein said power transmission means (51) includes a drive pulley (52) driven by said power supply unit (50) for rotation about a vertical axis, a driven pulley (62) mounted by said axle means (16) for rotation about a horizontal axis, a pair of direction change pulleys (58,58) mounted by said one end of said side wall portion (20) for rotation about a horizontal axis disposed normal to the axes of rotation of said drive and driven pulleys (52 and 62), and an endless drive belt (60) trained about said drive, driven, and direction change pulleys.

9. A high speed conveying system accommodating for the weighing of products arranged in a selectively adjustable number of parallel product lines upwards of a given number of such product lines, comprising in combination:

a single delivery conveyor having a width sufficient to selectively accommodate thereon upwards of said given number of said product lines;

a single take-away conveyor arranged in an aligned spaced relationship with said delivery conveyor and having a width sufficient for receiving all of said given number of said product lines; and a plurality of slim plan view weighing/conveyor devices removably positioned between said delivery and take-away conveyors for alignment one with each of said product lines selectively accommodated by said delivery conveyor for weighing products delivered thereby and transferring weighed products to said take-away conveyor, said devices each including a compression type strain gauge transducer means having a slim plan view longitudinally extended configuration arranged for alignment with one of said product lines, conveyor means, a power supply unit, power transmission means interconnecting said supply unit to said conveyor means and a structure for mounting said conveyor means, said power supply unit and said transmission means on said transducer means in a manner characterized in that said transducer means, said power supply unit, said conveyor means and said transmission means are substantially congruent within a common plan view profile of minimum width.

* * * * *